Patented Oct. 17, 1944

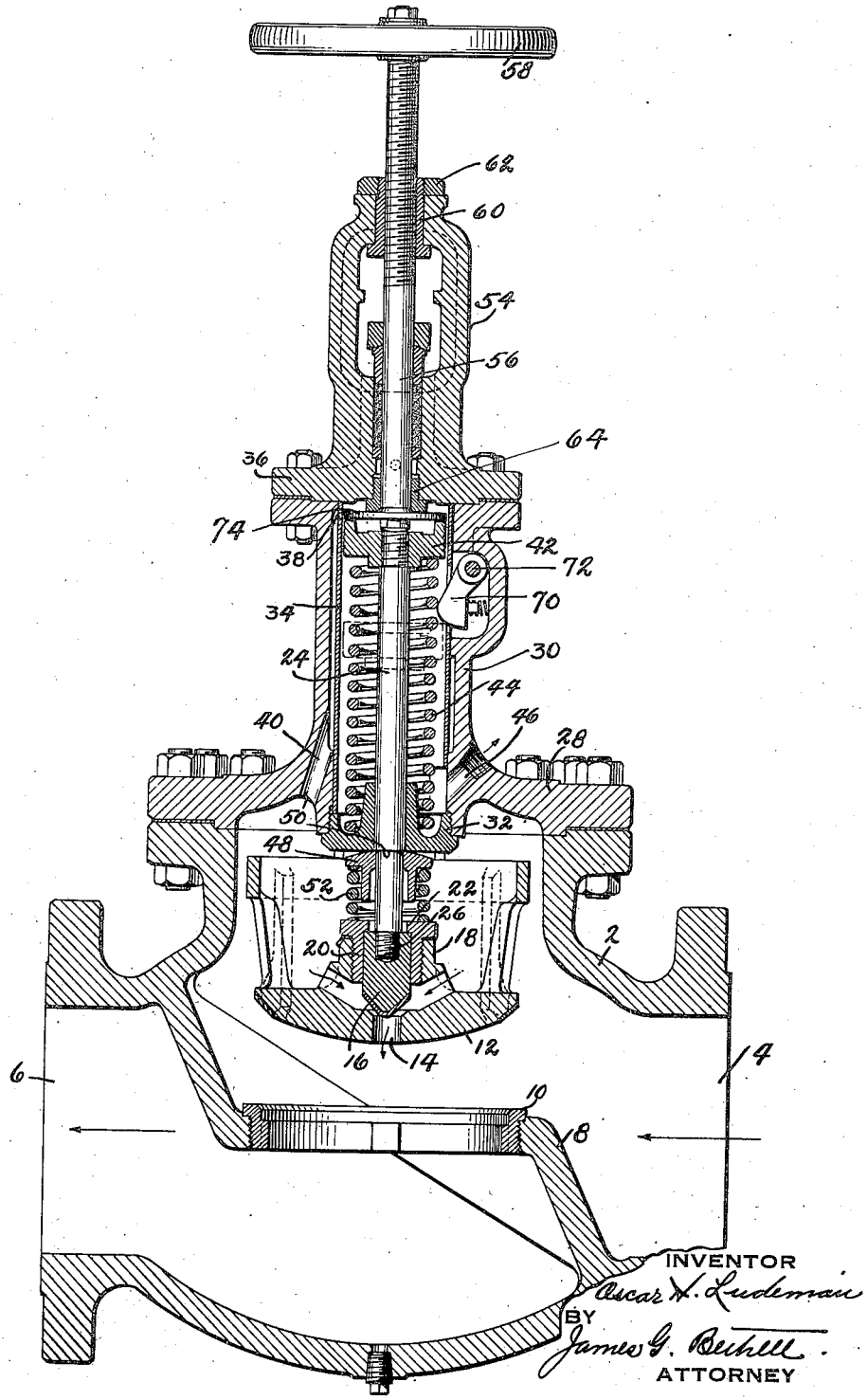

2,360,612

UNITED STATES PATENT OFFICE 2,360,612

VALVE

Oscar H. Ludeman, New York, N. Y.

Application May 29, 1943, Serial No. 489,041

7 Claims. (Cl. 137—139)

This invention relates to an improvement in valves for controlling the flow of pressure fluids such as steam, for example, and has for one of its objects to provide such a valve which is of new and novel construction.

More specifically the present invention provides a combined automatic, manual remote control valve in which the valve closes in the direction of flow of the pressure fluid being controlled, closing being effected either manually or by establishing either manually or automatically an unbalanced pressure on the valve in a direction to close it, the valve being automatically opened under the action of a main spring when pressure conditions have been altered so that the valve is sufficiently pressure balanced to enable this spring to open it. The main valve is provided with a built-in pilot or by-pass valve, and a spring is provided for unseating this pilot valve, this same spring preventing chattering between the unseated pilot valve and the main valve, and functioning to cushion both valves when the same are moving to open position under the action of the main spring above referred to.

An embodiment of my invention has been illustrated in sectional elevation in the accompanying drawing.

Referring to the drawing in detail: 2 designates the valve body equipped with inlet 4 and discharge 6 separated by diaphragm 8 provided with seat 10 for the main valve 12.

The valve 12 is provided centrally with pilot or by-pass port 14 controlled by pilot or by-pass valve 16.

The upper face of the main valve is shaped to provide disc extension 18, the upper end of which receives the disc nut 20 in which the pilot valve 16 is mounted for vertical movement relatively to the main valve, to enable the pilot valve to open and close its port 14 which, as above pointed out, is formed in the main valve.

The disc nut 20 overlies the top of the pilot valve, as illustrated at 22, so that after the valve has opened, further upward movement of the same will effect opening movement of the main valve.

Stem 24 designates a valve stem, the lower end of this stem being connected directly to the pilot valve. For purposes of illustration I have shown this stem screwed into the top of the pilot valve, as shown at 26.

The valve body 2 is provided with cap 28, shaped to provide a vertically extending cylindrical portion 30, and the valve stem 24 extends into this cylinder, through stem guide 32 which is screwed into the lower end of the cylinder. The stem 24 is a clearance fit in this stem guide.

The cylinder 30 is lined with a stainless steel tube 34. The upper end of the lining tube is ported, as shown at 38, and the cylinder itself is ported at its lower end, as illustrated at 40, and inasmuch as the inside diameter of the cylinder is larger than the outside diameter of the lining tube, the latter, at its upper end, is always in communication with the pressure fluid at the pressure side of the diaphragm 8.

Rigidly secured to the upper end of the valve stem 24 is trip piston 42. This piston lies within the lining tube 34 in which it has a clearance fit, the external diameter of the piston being less than the internal diameter of the lining tube.

Within the cylinder lining tube 34 and above stem guide 32 is valve-opening main spring 44.

In addition to the pressure port 40 already referred to, the valve body cap 28 is provided with pressure release port 46. This port extends to the interior of the cylinder lining 34. This port or duct in practice is equipped with any suitable valve arrangement whereby the duct can be controlled manually or automatically, as may be desired.

Mounted upon the valve stem 24 is a spring seat 48. This seat is loose on the valve stem 24, but the stem is shouldered just above it as seen at 50, so that when the stem moves downwardly, the spring seat will be carried along with it.

Between the by-pass spring seat 48 and the disc nut 20 is by-pass spring 52.

The main valve 12 and by-pass valve 16 are shown in open position. Under these conditions the release port 46 is closed, and both faces of the piston 42 are subjected to the pressure of the fluid being controlled because of the ports 40 and 38, the clearance fit of the piston 42 and the guide leakage between the valve stem 24 and stem guide 32. Consequently the valves will remain open. To close the valves, it is merely necessary to open the pressure release 46, which, as above noted, may be done manually or automatically, by a simple valve arrangement, or the pressure release may be vented due to some casualty on the downstream side of the valve.

With the release 46 open, it will be appreciated that there is a pressure differential between the two faces of the piston 42 almost instantly to overcome the action of the springs 44 and 52, closing the pilot valve 16 and the main valve 12. Closing of the main valve is actually in advance of the pilot valve due to the spring 52.

The cylinder head 36 is extended vertically in the form of a yoke 54 and extending upwardly through this yoke is wheel stem 56 which is in alignment with the valve stem 24. This stem 56 carries handwheel 58 at its upper end.

60 designates the stem nut and 62 stem lock nut for the handwheel stem, while 64 which is at the lower end of the handwheel stem designates a bushing for the handwheel stem.

When the pilot and main valves have been closed, as above described, the handwheel stem is turned down to rest upon the top of the valve stem 24, to prevent automatic opening of the pilot valve 16 via spring 52, which would otherwise occur following closure of the release 46.

The cylindrical portion 30 of the valve body cap 28 is provided interiorly with a spring-loaded locking pawl 70 which is pivoted at 72. This locking pawl engages the trip piston 42 when the latter moves outwardly of its cylinder on the closing movement of the valve 12, to lock the valve on its seat.

Carried on the lower end of the handwheel stem 56 is a washer 74, and this washer is adapted to engage the pawl 70 to move the same outwardly when the handwheel stem is turned down so that its lower end rests upon the top of the valve stem 24 as above described. It will be seen, therefore, that when the main valve 12 is once seated it is locked in this position and in order for the valve to be unseated again the handwheel stem must be turned down and then backed off. In other words, should the valve 12 seat, and then the release 46 be closed, the valve 12 will not be permitted to open until it has first been unlocked by disengagement of the pawl 70, so that accidental opening of the valve is prevented and accidents avoided.

To unseat the valve 12, it is necessary, of course, that release 46 has been closed. The next step is to begin backing off the handwheel stem 24. As the handwheel stem is backed off the piston 42 will follow it under the action of the springs 44 and 52, the pawl 70 being held by the washer 74 out of locking position until the piston 42 has moved sufficiently so that it is no longer locked by the pawl. The pilot valve 16 by this time has opened under the influence of the springs 44 and 52 so that the pressure on the two faces of the main valve 12 will be so nearly balanced that the pressure differential is insufficient to overcome the lifting power of spring 44 and the latter will unseat the valve.

It will be appreciated that with the pressure release 46 open the valves 12 and 16 will remain closed indefinitely, whether the handwheel stem 56 has been turned down or not, so that in the event of the pressure release line being opened from any cause, either manual or casualty, the valves 12 and 16 will close and remain closed until repairs have been effected.

It will be appreciated, also, as just explained, that in order for the valve 12 to be opened again, it is not only necessary to close the pressure release, but it becomes necessary to unlock the valve by first turning the handwheel stem down and then with the pressure release closed to back off the handwheel.

It will be appreciated, furthermore, that by providing the spring 52 with one end against spring seat 48, which is loose on stem 24, and its other end abutting disc nut 20, not only does this spring unseat the pilot valve, but it prevents chattering between the unseated pilot valve and the main valve, and functions to cushion both valves when the same are moving to open position under the action of spring 44.

It is to be understood that changes may be made in the details of construction and arrangement of parts herein illustrated and described within the spirit and scope of the invention.

What I claim is:

1. In valve mechanism for controlling the flow of pressure fluids and comprising a valve body having an inlet port and a discharge port separated by a ported diaphragm, the combination of a main valve for said diaphragm port closing in the direction of flow of the pressure fluid, a spring for opening said valve, a locking pawl for holding said valve in closed position, a stem for said valve, and a handwheel stem adapted to engage the said valve stem to hold the valve closed and simultaneously to unlock said pawl, whereby when the handwheel stem is backed off the said valve can open.

2. In valve mechanism for controlling the flow of pressure fluids and comprising a valve body having an inlet port and a discharge port separated by a ported diaphragm, a main valve for said diaphragm port closing in the direction of flow of the pressure fluid, a cylinder carried by the valve body, a stem for said valve extending into said cylinder, a piston in said cylinder out of contact with the walls of the cylinder, means for admitting pressure fluid to each face of the piston, a pressure release from the cylinder at the valve side of said piston, a lock for locking said valve in closed position, a handwheel stem adapted to engage said valve stem to hold said valve closed and simultaneously to release said lock, and a valve spring, on said valve stem and placed under compression by said piston when the valves closes, for opening said valve as said handwheel stem is backed off with said pressure release closed.

3. In valve mechanism for controlling the flow of pressure fluids and comprising a valve body having an inlet port and a discharge port separated by a ported diaphragm, the combination of a main valve for said diaphragm port, a spring for opening said valve, a locking pawl for locking said valve closed, a stem for said valve, and a handwheel stem adapted to engage the said valve stem to hold the valve closed and simultaneously to unlock said pawl, said pawl remaining unlocked until the valve is again closed.

4. In valve mechanism for controlling the flow of pressure fluids and comprising a valve body having an inlet and an outlet separated by a ported diaphragm, the combination of a valve for the diaphragm port, a spring for opening said valve, a locking pawl for locking the valve in closed position, a stem for said valve, a piston thereon adapted to be engaged by said locking pawl when the valve closes to hold the valve in closed position, a hand operated stem adapted to engage the valve stem and simultaneously move the locking pawl out of locking engagement with said piston, said hand operated stem, on opening movement of the valve under the action of said spring, holding the locking pawl out of operative or locking position until said piston has moved out of pawl-locked position.

5. In valve mechanism for controlling the flow of pressure fluids and comprising a valve, a spring for opening the same, a stem for the valve, a piston carried by said stem, a manually operated stem adapted to engage the valve stem in a direction to oppose opening of the valve under the action of the said spring, a locking pawl in the path of said piston as the valve moves to closed position and adapted to hold the valve closed, and means carried at the end of said hand operated stem for unlocking said pawl when said hand operated stem is moved into engagement with the valve stem with the valve in closed position.

6. In valve mechanism for controlling the flow of pressure fluids and comprising a valve which is closed by the pressure of the fluid being controlled and opened by a spring, a locking pawl, a stem for said valve, an abutment carried thereby engaging said pawl when the valve closes, thereby to lock the valve in closed position, and a handwheel stem for engaging the locking pawl to actuate the pawl out of locking position relative to said abutment and hold it out of locking position while the valve spring is opening the valve.

7. In valve mechanism for controlling the flow of pressure fluids, the combination of a valve adapted to be closed by pressure of the fluid being controlled, a spring for opening the valve, a stem for the valve, an abutment affixed thereto, a locking pawl for engaging the said abutment on closing movement of the valve to lock the valve closed, a handwheel stem in axial alignment with the valve stem and adapted when moved into engagement with the valve stem to actuate the said pawl out of locking position while preventing opening of the valve, retraction of said handwheel stem maintaining the pawl out of locking position until the valve opens sufficiently to carry the said abutment out of the range of the locking pawl.

OSCAR H. LUDEMAN.